(12) United States Patent
Gronholm et al.

(10) Patent No.: US 8,814,237 B2
(45) Date of Patent: Aug. 26, 2014

(54) UTENSILS USED FOR MANIPULATING CONTAINERS

(71) Applicants: Mike Gronholm, Milwaukee, OR (US); Geoff Gronholm, Portland, OR (US)

(72) Inventors: Mike Gronholm, Milwaukee, OR (US); Geoff Gronholm, Portland, OR (US)

( * ) Notice: Subject to any disclaimer, the term of this patent is extended or adjusted under 35 U.S.C. 154(b) by 64 days.

(21) Appl. No.: 13/627,178

(22) Filed: Sep. 26, 2012

(65) Prior Publication Data

US 2014/0084611 A1    Mar. 27, 2014

(51) Int. Cl.
*A47J 45/00* (2006.01)

(52) U.S. Cl.
USPC ......................................................... 294/27.1

(58) Field of Classification Search
CPC ... A45F 5/10; A45F 2200/0525; A45F 5/102; B65G 7/12; A47J 45/071; A47J 45/10; B65D 25/32; B44D 3/14
USPC .......... 294/27.1, 31.2, 87.2, 90, 91, 137, 150, 294/151, 153, 159, 165, 166, 167, 33; 224/148.1, 148.2; 215/386, 396–398; 206/151, 159; 220/757–759; 40/310
See application file for complete search history.

(56) References Cited

U.S. PATENT DOCUMENTS

| | | | | |
|---|---|---|---|---|
| 5,692,630 A * | 12/1997 | Hsu | .............................. | 215/396 |
| 6,244,554 B1 * | 6/2001 | Baker | ........................... | 248/312 |
| 7,070,075 B2 * | 7/2006 | Forsman et al. | ........... | 224/148.2 |
| 7,398,891 B2 * | 7/2008 | Yang | ........................... | 220/212.5 |
| 7,628,433 B2 * | 12/2009 | Schwartz | ..................... | 294/27.1 |
| 2005/0056614 A1 * | 3/2005 | Morano et al. | ................ | 215/396 |
| 2007/0170733 A1 * | 7/2007 | Lion et al. | ......................... | 294/7 |

* cited by examiner

*Primary Examiner* — Stephen Vu
(74) *Attorney, Agent, or Firm* — Mohr Intellectual Property Law Solutions, PC

(57) ABSTRACT

A utensil for manipulating a container that includes an open end that is substantially in the shape of a cylinder or conical frustrum. In some examples, the utensil includes a substantially flat body further including a curved end complimenting the shape of the container and defining an aperture, an elongated support member affixed to the body opposite the curved end, and a retaining member that is affixed to the curved end the body, is configured to selectively retain the container in cooperation with the body in a position where the open end of the container overlies the aperture defined in the body when the container is selectively retained by the retaining member, and compliments the shape of the container. In further examples, the utensil's retaining member includes a plurality of detents configured to selectively restrict the container in a position retained by the retaining member.

20 Claims, 11 Drawing Sheets

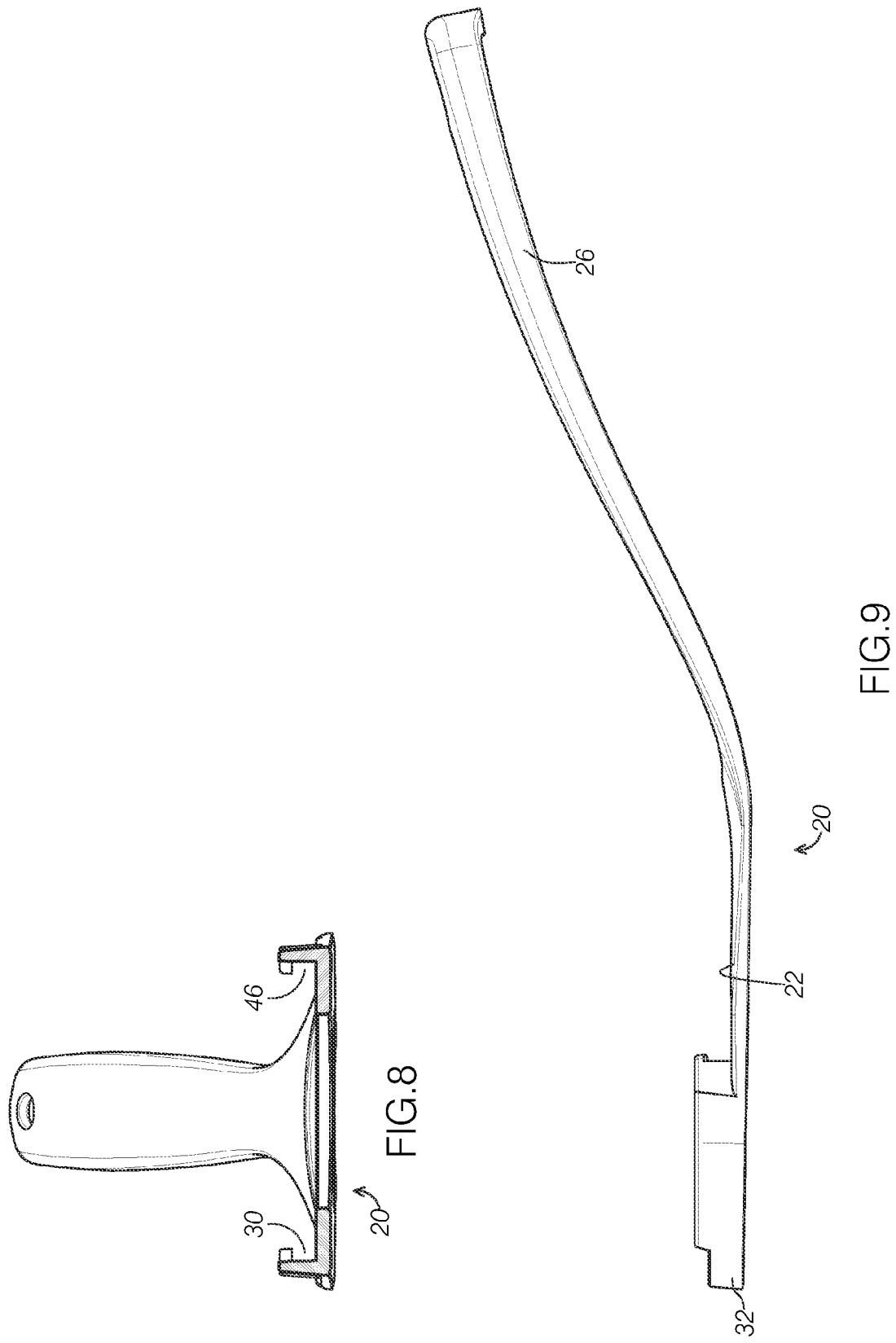

UTENSILS USED FOR MANIPULATING CONTAINERS

BACKGROUND

The present disclosure relates generally to hand-held utensils. In particular, utensils combined with handles adapted for handling or manipulating containers are described.

Known utensils are not entirely satisfactory for the range of applications in which they are employed. For example, many existing utensils are not capable of effectively retaining a reusable container and its associated lid for the purpose of manipulating the container. In addition, conventional utensils that are capable of retaining a reusable container typically feature a mechanism that grabs on to the container to secure it in the utensil. In many of those cases, the user may be required to provide a constant force on the utensil in order for the container to be properly secured.

The advent of the single-serve brewing machine or K-Cup® machine has creates a need for a reusable container. Traditionally, K-Cup® machines utilize a disposable K-Cup® pack that contains pre-filled grounds or other brew material desired by the user. Once the K-Cup® machine has finished brewing the desired beverage, the K-Cup® pack or disposable container holding the messy grounds or brew material is discarded.

With the pre-filled disposable K-Cup® pack, the user is limited to enjoying a beverage brewed with that particular pre-filled brewing material. However, the use of a reusable container or reusable K-Cup® pack has become preferable to users wanting the flexibility of brewing beverages that aren't necessarily available the traditional pre-filled K-Cup® packs or pre-filled disposable containers. The reusable container allows a user to fill the container with his or her preferred grounds or brewing material.

Use of a reusable container necessitates a means for easily removing the residual grounds or brewing material from the reusable container so that the container is clean and ready for future use. Disposal of the brewing material by merely dumping the contents of the reusable container into a sink or waste receptacle is messy and inefficient.

Thus, there exists a need for utensils that improve upon and advance the design of known hand-held utensils. Examples of new and useful utensils relevant to the needs existing in the field are discussed below.

SUMMARY

A utensil or manipulating a container that includes an open end that is substantially in the shape of a cylinder or conical frustrum. In some examples, the utensil includes a substantially flat body further including a curved end complimenting the shape of the container and defining an aperture, an elongated support member affixed to the body opposite the curved end, and a retaining member that: is affixed to the curved end of the body, is configured to selectively retain the container in cooperation with the body in a position where the open end of the container overlies the aperture defined in the body when the container is selectively retained by the retaining member, and compliments the shape of the container. In further examples, the utensil's retaining member includes a plurality of detents configured to selectively restrict the container in a position retained by the retaining member.

BRIEF DESCRIPTION OF THE DRAWINGS

FIG. 8 is a cross-sectional view of the utensil taken along the line 8-8 shown in FIG. 5.

FIG. 9 is a left-side elevation view of the utensil shown in FIG. 1.

DETAILED DESCRIPTION

Figure 1:
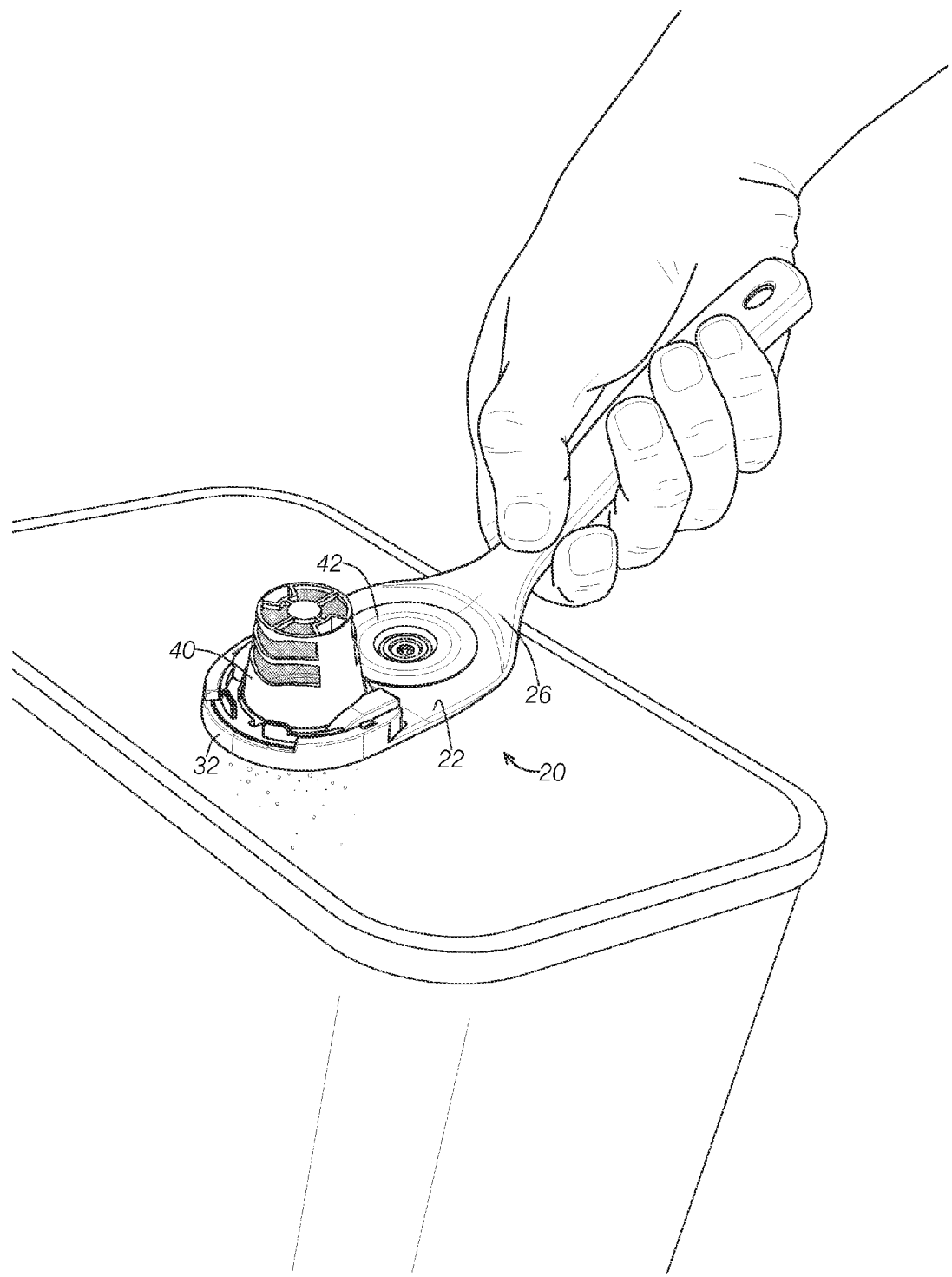
FIG. 1 is a perspective view of a first example of a utensil in use.

The disclosed utensils will become better understood through review of the following detailed description in conjunction with the figures and claims. The detailed description and figures provide merely examples of the various inventions described herein. Those skilled in the art will understand that the disclosed examples may be varied, modified, and filtered without departing from the scope of the inventions described herein. Many variations are contemplated for different applications and design considerations; however, for the sake of brevity, each and ever contemplated variation is not individually described in the following detailed description.

Throughout the following detailed description, examples of various utensils are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-13, a first example of a utensil 20 will now be described. Utensil 20 includes a body 22, a support member 6 and a retaining member 28. Utensil 20 functions to properly orient and hold stationary a cylindrically-shaped container 40 for the purpose of allowing a user to empty the contents of the container 40 into a waste receptacle. Further, utensil 20 is configured to work with containers of various sizes.

Figure 2:
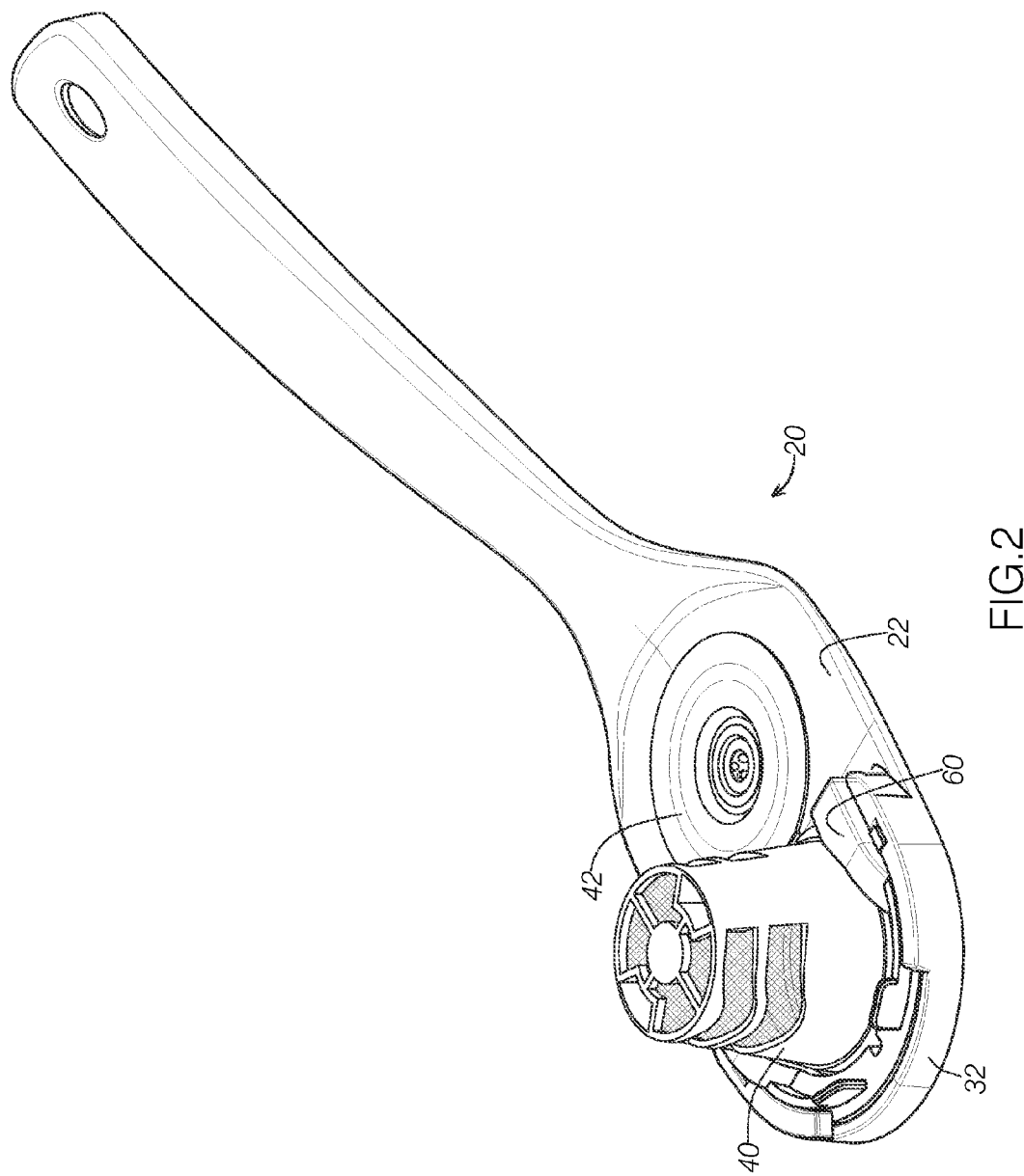
FIG. 2 is a perspective view of the top of the utensil with a container and lid inserted into the utensil shown in FIG. 1.
Figure 3:
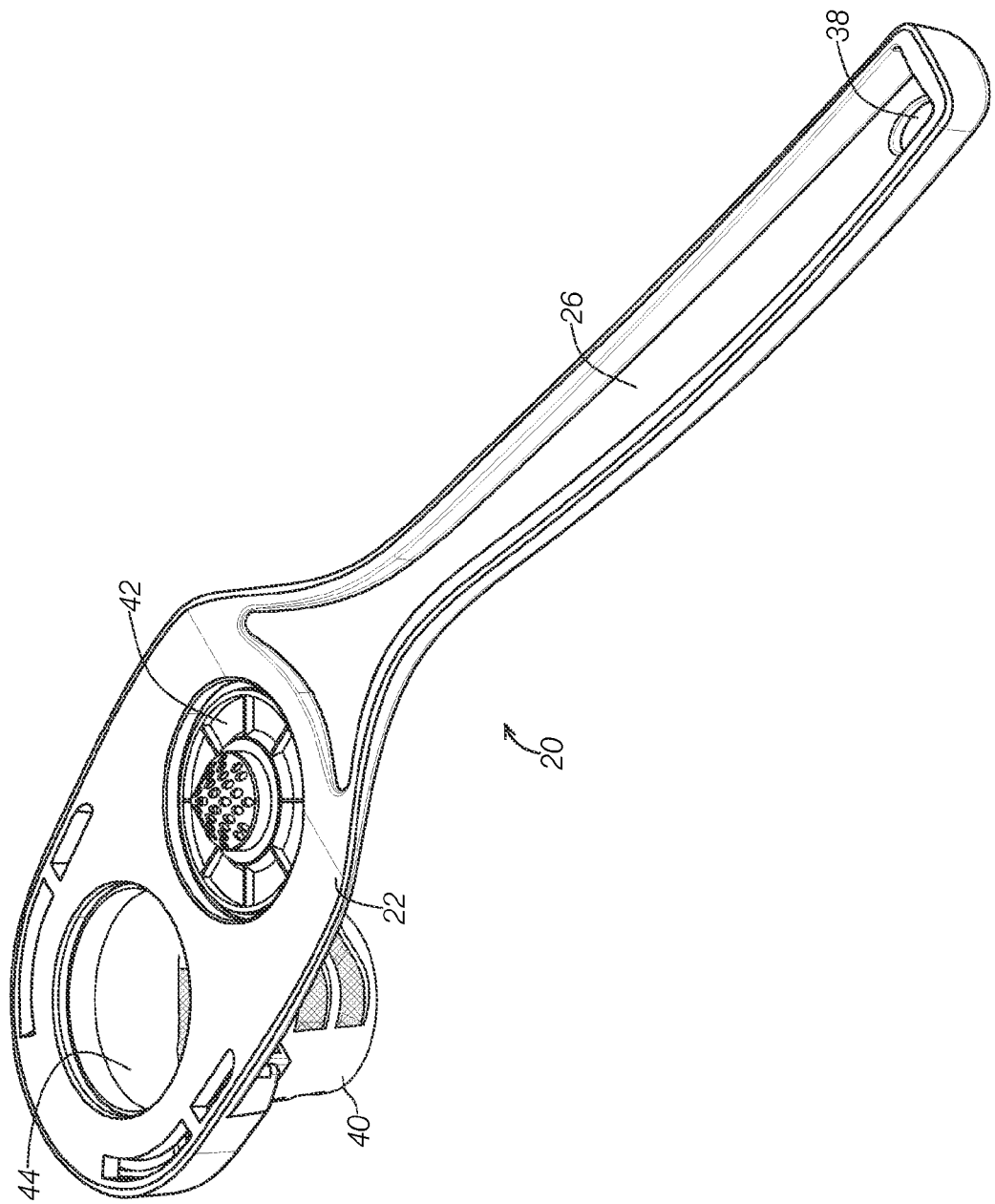
FIG. 3 is a perspective view of the bottom of the utensil with the container and lid inserted into the utensil shown in FIG. 1.
Figure 4:
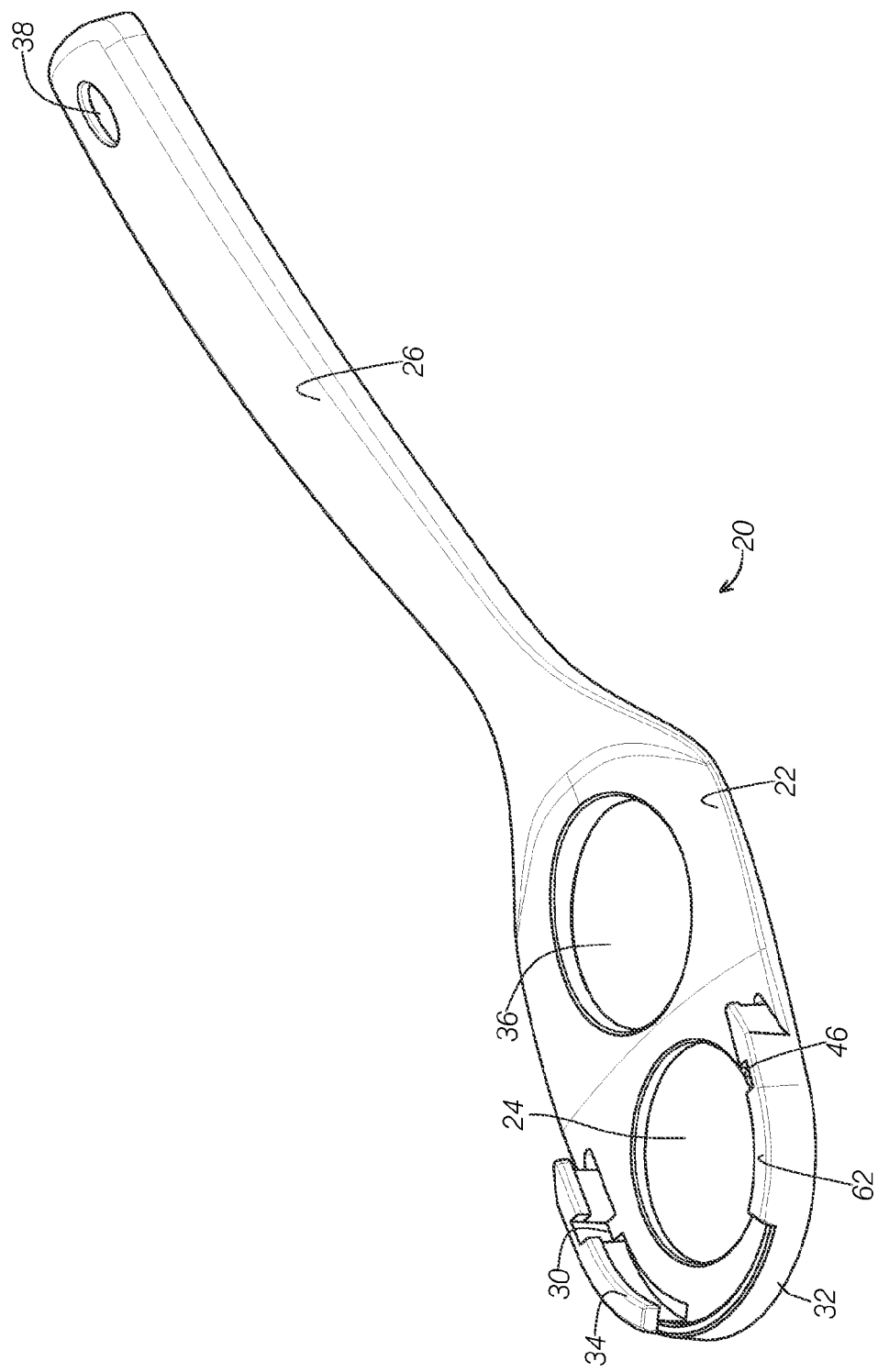
FIG. 4 is a perspective view of the top of the utensil shown in FIG. 1.
Figure 5:
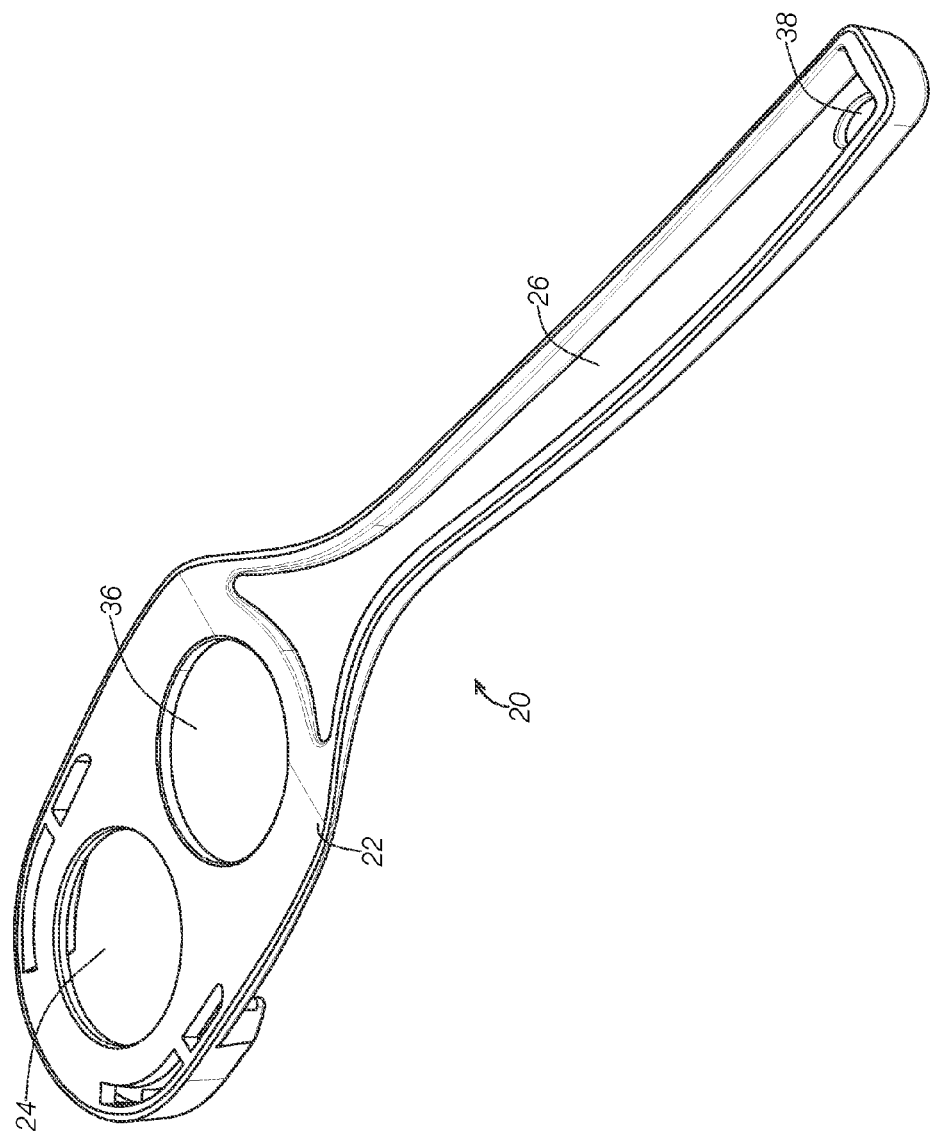
FIG. 5 is perspective view of the bottom of the utensil shown in FIG. 1.
Figure 6:
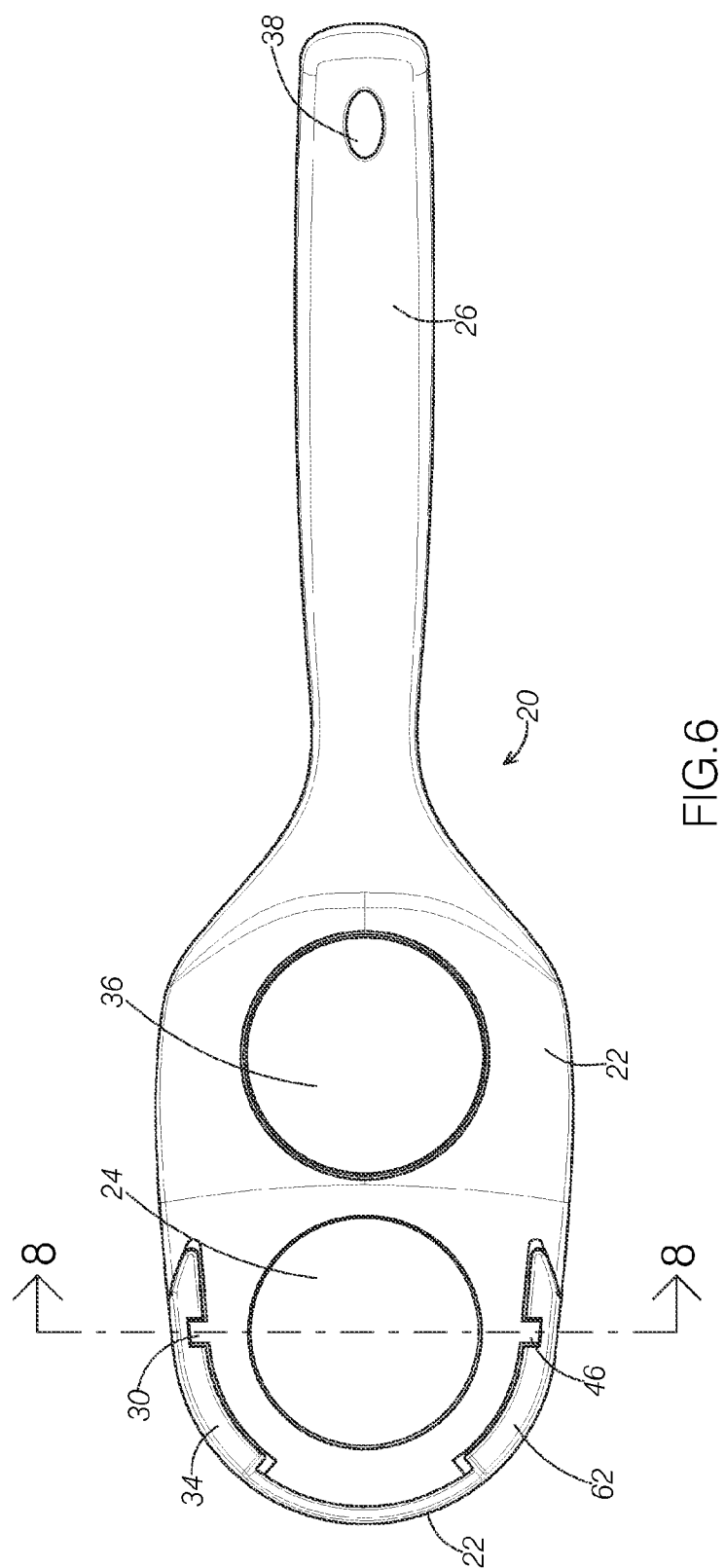
FIG. 6 is a top plan view of the utensil shown in FIG. 1.
Figure 7:
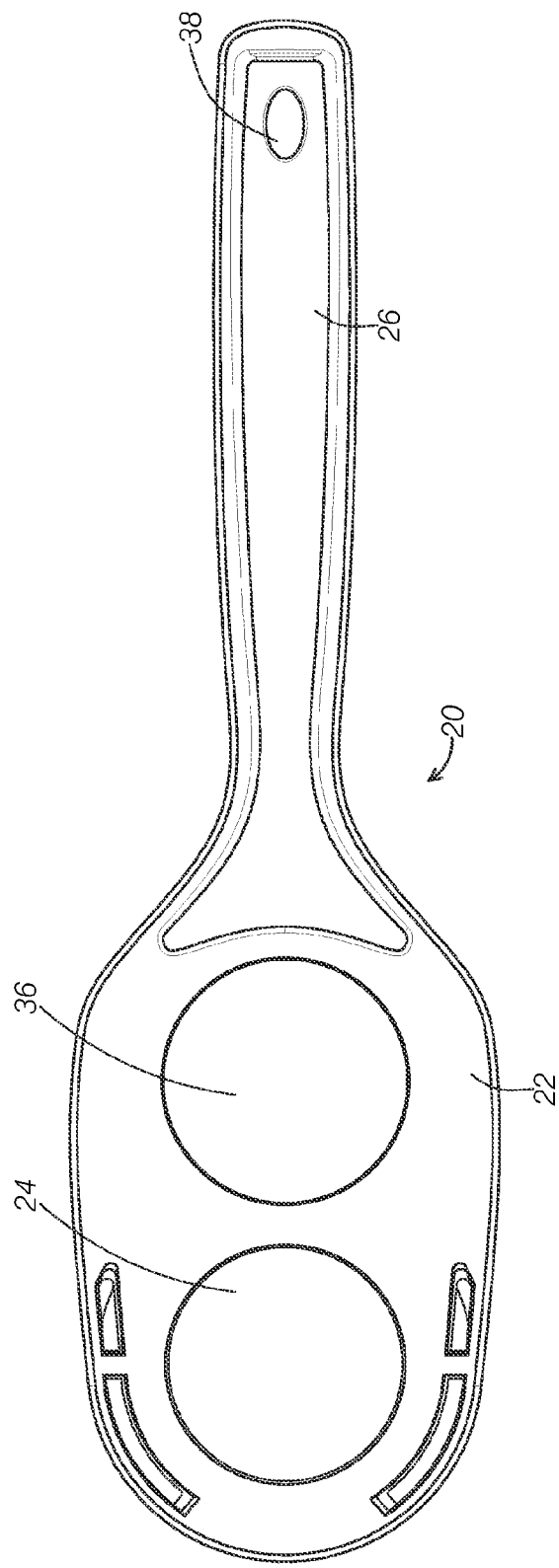
FIG. 7 is a bottom plan view of the utensil shown in FIG. 1.

With reference to FIGS. 2 and 3, utensil 20 functions to accommodate both container 40 and its associated lid 42. Lid 42 is secured to container 40 generally by a tether (not shown). Container 40 is substantially in the shape of a cylinder or conical frustrum and is retained in utensil 20 by retaining member 28. Alternatively, the container may be of various sizes and geometric shapes.

Container 40 is configured to receive beverage granules and to be used in single-serve brewing machines, such as K-Cup® ® machines. In the example shown in the figures, container 40 is configured to be reused multiple times. In other examples, the container is configured to be used once and then disposed. In still other examples, the container is configured to hold other contents, such as spices, powders, liquids, and gels.

In operation, a user inserts a container 40 into utensil 20 so that the container mouth is oriented upwards. Once container 40 is secured in place by both body 22 and retaining member 28, the user may invert utensil 20 over a waste receptacle (see FIG. 1) or sink, causing orientation of the container mouth to be in a downward direction, thus allowing the contents of container 40 to be completely emptied. Additionally, the user may strike an underside portion of utensil 20 against the waste receptacle or sink to aid in emptying the contents of container 40.

As can be seen in FIGS. 4-7, a substantially flat body 22 includes a curved end complimenting the shape of container 40 and defining a first aperture 24, a side wall member 32 projecting away from the body, a first lip member 34 and a second lip member 62 extending away from sidewall member 32 to overlie a portion of body 22, and a first notch 30 and a second notch 46 integrally formed within first lip member 34 and second lip member 62 respectively. In other examples, the body includes a flat or irregular shaped end. Further, body 22 defines a second aperture 36 disposed adjacent to first aperture 24. In some examples, the utensil may have two apertures, one aperture, or even three apertures.

First aperture 24 is configured to receive container 40, whereas, second aperture 36 is configured to receive container lid 42. Second aperture 36 is spaced from first aperture 24 a distance selected to enable second aperture 36 to receive lid 42 when container 40 is selectively retained to body 22 by retaining member. The circumference of both container 40 and lid 42 substantially align with the opening size or circumference (when the aperture defines a circle) of first aperture 24 and second aperture 36 respectively. In some examples, the circumference of the first aperture is larger or smaller than the circumference of the container mouth.

With reference to FIGS. 4-7, an elongated support member 26 is affixed to body 22 opposite the curved end. Support member 26 is integrally formed with body 22 and is disposed at an acute angle relative to an upper surface of body 22. Further, support member 26 defines a hole 38 through which a projection may be received for storing utensil 20 in a hanging configuration. In some examples, the support member may not include a hole. Additionally, support member 26 is substantially tapered and integrally formed with body 22. In some examples, the support member may be mechanically attached to the body.

Figure 12:
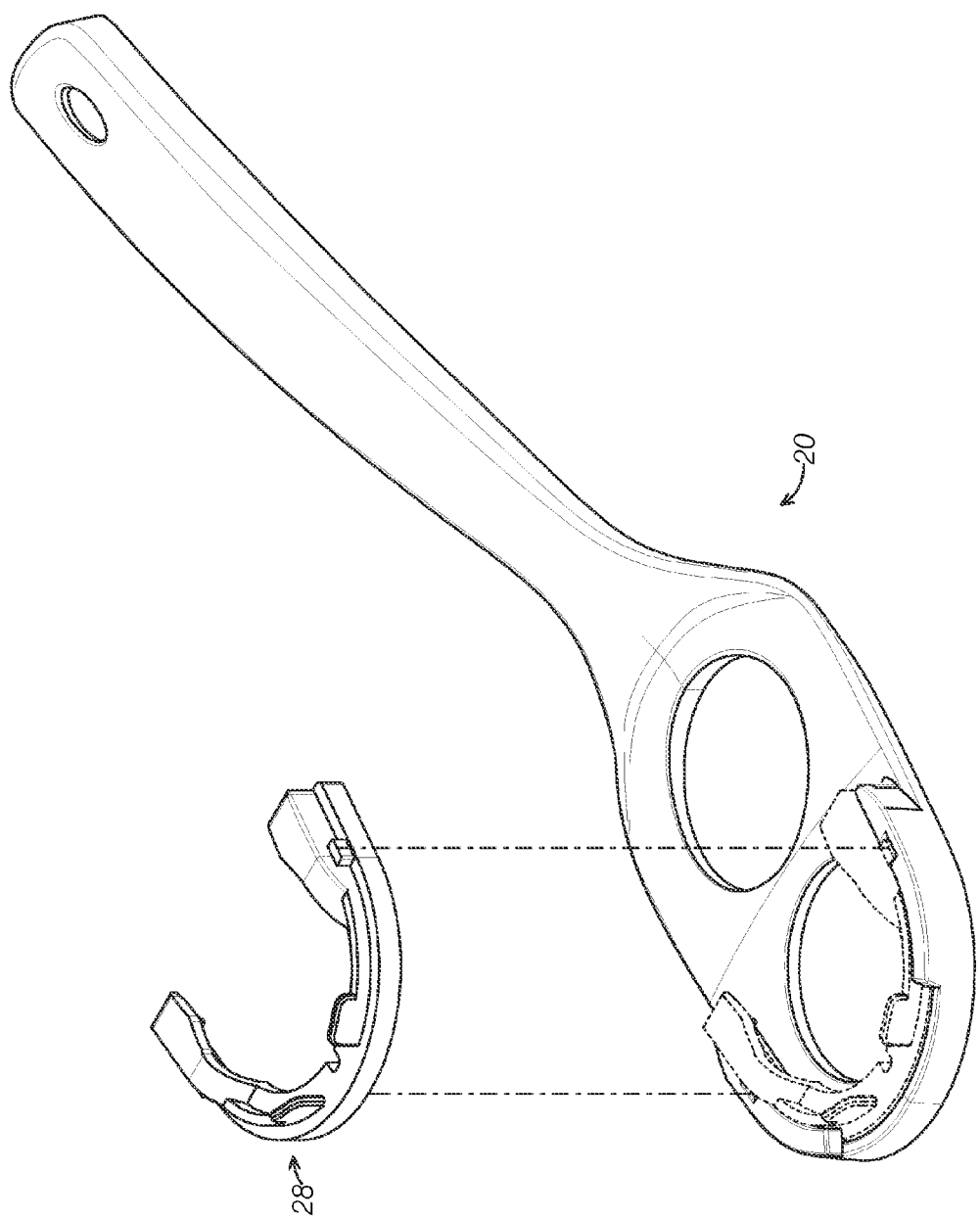
FIG. 12 is a perspective view of the utensil shown in FIG. 1 separated from the first example of the retaining member.

In the example shown in FIG. 12 retaining member 28 is removably affixed to the curved end of body 22 and is configured to selectively retain the container 40 in cooperation with body 22 in a position where the open end of container 40 overlies first aperture 24 when container 40 is selectively retained by retaining member 28. Additionally, retaining member 28 may be selectively interchanged to alloy utensil 20 to accept containers of varying sizes and geometric shapes.

Figure 10:
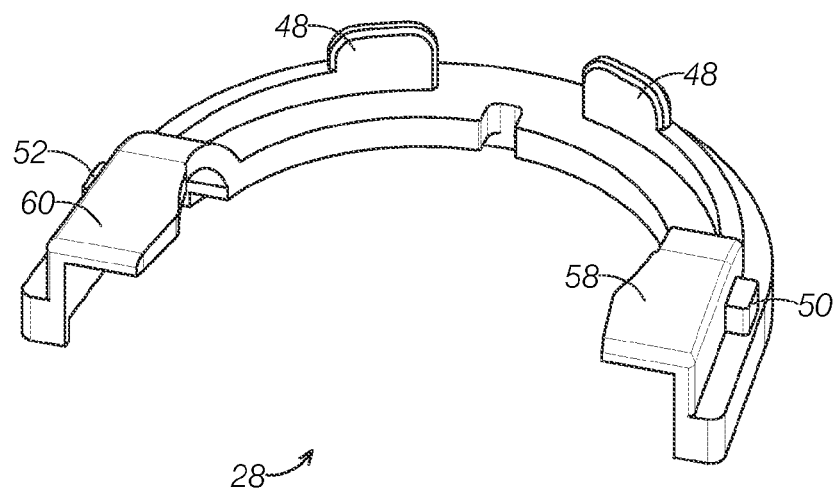
FIG. 10 is a perspective view of a first example of a retaining member.

As can be seen in FIG. 10, retaining member 28 includes a plurality of teeth 48 disposed adjacent to each other and proximal a curved end of retaining member 28, a first dowel 50 and a second dowel 52 disposed directly opposite each other and complementarily oriented so that first dowel 50 slidingly engages first notch 30 of first lip member 34 and second dowel 52 slidingly engages second notch 46 of second lip member 62, and a first elevated lip 58 and a second elevated lip 60 disposed directly opposite each other and distal the curved end of retaining member 28. Removal of retaining member 28 is achieved by a user depressing on both first elevated lip 58 and second elevated lip 60 simultaneously so that first dowel 50 and second dowel 52 become disengaged from first notch 30 and second notch 46. User can then slidingly remove retaining member 28 from utensil 20.

Sidewall 32 substantially aligns with the curved end of retaining member 28 and guides retaining member 28 so that first dowel 50 and second dowel 52 seat properly into first notch 30 and second notch 46 respectively, securing retaining member to body 22. Retaining member 28 cooperates with body 22 to orient the circumference of container 40 with the circumference of first aperture 24. Additional cooperation between retaining member 28 and body 22 occurs so that the mouth of container 40 substantially overlies the circumference of second aperture 36.

First elevated lip 58 and second elevated lip 60 function to guide container 40 into retaining member 28. Container 40 is properly seated into retaining member 28 when container's 40 heat resistant grips (not shown) are fully inserted in a cavity just below both first elevated lip 58 and second elevated lip 60 respectively. First elevated lip 58 and second elevated lip 60 cooperate with retaining member 28 and body 22 to securely hold container 40 in a stationary position. Removal of container 40 is achieved when a user slidingly disengages container 40 from retaining member 28.

Figure 11:
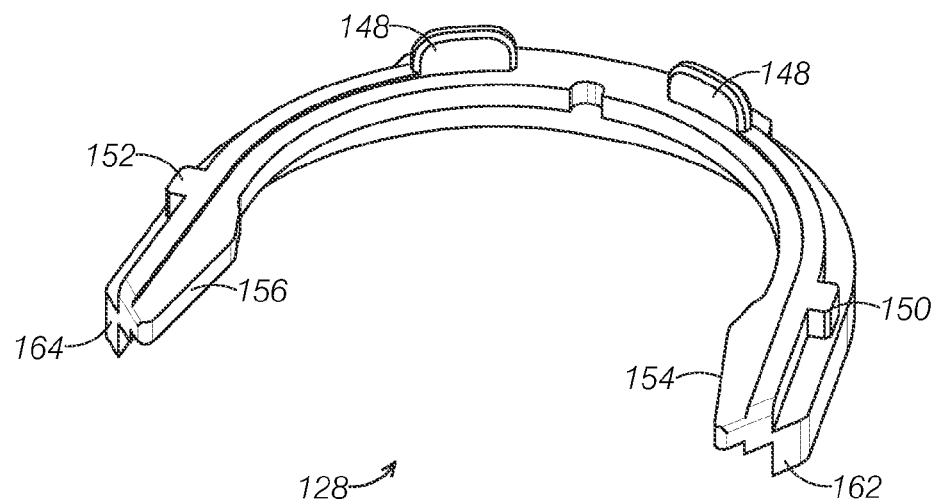
FIG. 11 is a perspective view, of a second example of a retaining member.
Figure 13:
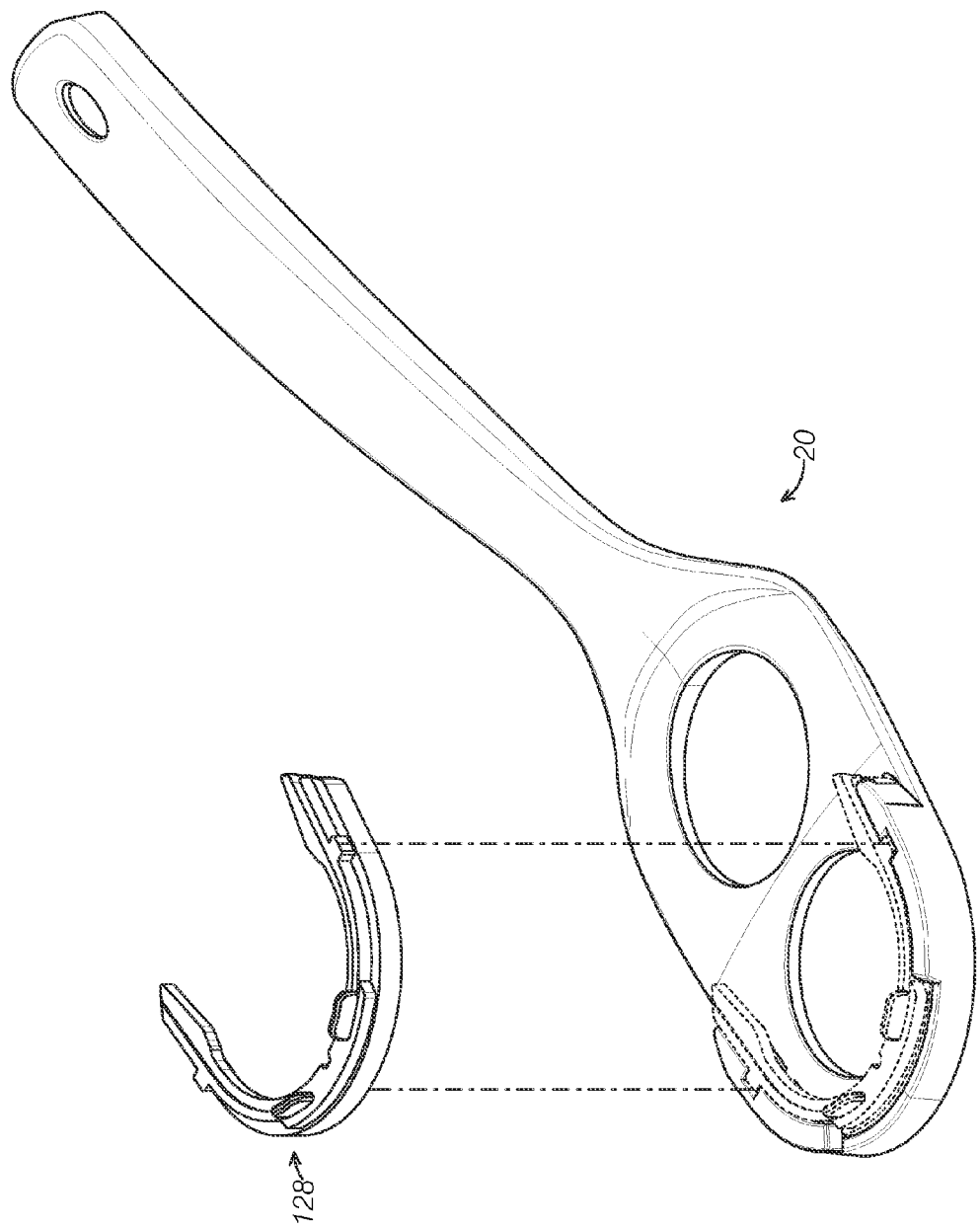
FIG. 13 is a perspective view of the utensil shown in FIG. 1 separated from the second example of the retaining member.

Turning attention to FIGS. 11 and 13, a second example of a retaining member 128 now be described. Retaining member 128 includes many similar or identical features to retaining member 28. Thus, for the sake of brevity, each feature of retaining member 128 will not be redundantly explained. Rather, key distinctions between retaining member 128 and retaining member 28 will be described in detail and the reader should reference the discussion above for features substantially similar between the two retaining members.

As can be seen in FIG. 11, retaining member 128 includes a plurality of teeth 148 disposed adjacent to each other and proximal a curved end of retaining member 128, a first dowel 150 and a second dowel 152 disposed directly opposite each other and complementarily oriented so that first dowel 150 slidingly engages first notch 30 of first lip member 34 and second dowel 152 slidingly engages second notch 46 of second lip member 62, and a first detent 154 and a second detent 156 disposed directly opposite each other and distal the curved end of retaining member 128.

Retaining member 128 functions to hold stationary container 40 by securing it in place with both first decent 154 and second detent 156. First detent 154 and second detent 156 are inwardly tapered so that a container 40 being placed in retaining member 128 will be snugly fit, thus, allowing container 40 to be securely positioned in utensil 20. Removal of retaining member 128 is achieved by a user depressing on a first tapered end 162 and a second tapered end 164 simultaneously so that first dowel 150 and second dowel 152 become disengaged from first notch 130 and second notch 146. User can then slidingly remove retaining member 128 from utensil 20.

The disclosure above encompasses multiple distinct inventions with independent utility. While each of these inventions has been disclosed in a particular forms, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

We claim:

1. A utensil for manipulating a container that includes an open end, the container having a shape that is at least one of a cylinder and a conical frustrum, comprising:
   a substantially flat body including:
      a curved end complementing the shape of the container and defining an aperture;
      a sidewall member projecting away from the body;
      a first lip member and a second lip member extending away from the sidewall member on an end of the sidewall distal the body to overlie a portion of the body; and
      a first notch integrally formed within a portion of the first lip member and a second notch integrally formed within a portion of the second lip member;
   an elongated support member affixed to the body opposite the curved end; and
   a retaining member that:
      is removably affixed to the curved end of the body;
      is configured to selectively retain the container in cooperation with the body in a position where the open end of the container overlies the aperture defined in the body when the container is selectively retained by the retaining member; and
      complements the shape of the container.

2. The utensil of claim 1, wherein the aperture defines a first aperture, and the body further defines a second aperture disposed adjacent to the first aperture.

3. The utensil of claim 2, wherein:
   the container includes a lid selectively covering the open end and a tether securing the lid;
   the second aperture is spaced from the first aperture a distance selected to enable the second aperture to receive the lid when the container is selectively retained to the body by the retaining member; and
   the circumference of the second aperture is substantially the same as the circumference of the lid.

4. The utensil of claim 1, wherein the open end of the container includes a mouth and the circumference of the mouth substantially aligns with the circumference of the aperture.

5. The utensil of claim 1, wherein the first notch and the second notch are disposed directly opposite each other within the lip member.

6. The utensil of claim 5, wherein the curved body is configured to receive a variety of different removably affixed retaining members.

7. The utensil of claim 1, wherein the elongated support member is disposed at an acute angle relative to an upper surface of the substantially flat body.

8. The utensil of claim 1, wherein the elongated support member is substantially tapered.

9. The utensil of claim 1, wherein the elongated support member defines a hole through which a projection may be received for storing the utensil in a hanging configuration.

10. The utensil of claim 1, wherein the substantially flat body, and the elongated support member are integrally formed of plastic.

11. The utensil of claim 1, wherein the retaining member includes:
    a plurality of teeth disposed adjacent to each other and proximal a curved end of the retaining member;
    a first dowel and a second dowel disposed directly opposite each other and complementarily oriented so that the first dowel slidingly engages the first notch of the first lip member and the second dowel slidingly engages the second notch of the second lip member;
    a first detent and a second detent disposed directly opposite each other and distal the curved end of the retaining member.

12. The utensil of claim 11, wherein the first and second detent orient the container and the container lid so that the container mouth substantially overlies the first aperture and the container lid substantially overlies the second aperture.

13. A utensil for manipulating a container that includes an open end, the container having a shape that is at least one of a cylinder and a conical frustrum, comprising:
    a body including:
       a curved end complimenting the shape of the container and defining an aperture;
       a sidewall member projecting away from the body;
       a lip member extending away from the sidewall member on an end of the sidewall distal the body to overlie a portion of the body and;
       a first notch and a second notch integrally formed within a portion of the lip member;
    an elongated support member affixed to the body opposite the curved end; and
    a retaining member that:
       is removably affixed to the curved end of the body;
       is configured to selectively retain the container in cooperation with the body in a position where the open end of the container overlies the aperture defined in the body when the container is selectively retained by the retaining member; and
       complements the shape of the container.

14. The utensil of claim 13, wherein the aperture defines a first aperture, and the body further defines a second aperture disposed adjacent to the first aperture.

15. The utensil of claim 14, wherein:
    the circumference of the open end of the container substantially aligns with the circumference of the first aperture;
    the second aperture is configured to receive a lid member of the container; and
    the circumference of the lid member substantially aligns with the circumference of the second aperture.

16. The utensil of claim 13, wherein the first notch and the second notch extend from the lip member toward the body from a position on the lip member distal the body.

17. The utensil of claim 13, wherein the retaining member includes:
    a plurality of teeth disposed adjacent to each other and proximal a curved end of the retaining member;
    a first dowel and a second dowel disposed directly opposite each other and complementarily oriented so that the first dowel slidingly engages into the first notch of the first lip member and the second dowel slidingly engages into the second notch of the second lip member;

a first elevated lip and a second elevated lip disposed directly opposite each other, extending away from the retaining member, and distal a curved end of the retaining member.

18. The utensil of claim 17, wherein the first elevated lip and the second elevated lip are configured to receive and retain the container.

19. The utensil of claim 17, wherein the retaining member is selectively removed from the body by applying force simultaneously to the first elevated lip and the second elevated lip so that the first dowel and the second dowel become disengaged from the first notch and the second notch respectively.

20. The utensil of claim 17, wherein the plurality of teeth, the first dowel, the second dowel, the first elevated lip, and the second elevated lip are integrally formed of plastic with the retaining member.

* * * * *